United States Patent [19]

Leclaire

[11] Patent Number: 4,593,633
[45] Date of Patent: Jun. 10, 1986

[54] PROCESS FOR AT LEAST PARTLY AUTOMATING SEWING OPERATIONS AND SEWING MACHINE THEREFOR

[75] Inventor: Charly Leclaire, Dourges, France

[73] Assignee: Prouvost S.A., Nord, France

[21] Appl. No.: 570,372

[22] Filed: Jan. 13, 1984

[30] Foreign Application Priority Data

Jan. 17, 1983 [FR] France .............................. 83 00605

[51] Int. Cl.⁴ ............................................ D05B 19/00
[52] U.S. Cl. ............................ 112/121.11; 112/262.1; 112/275
[58] Field of Search ...................... 112/121.11, 121.12, 112/275, 277, 2, 262.1, 220

[56] References Cited

U.S. PATENT DOCUMENTS

| | | | |
|---|---|---|---|
| 3,613,608 | 10/1971 | Hinerfeld et al. ...................... | 112/2 |
| 3,799,084 | 3/1974 | Furnari .......................... | 112/121.11 |
| 4,104,976 | 8/1978 | Landau, Jr. et al. ............. | 112/121.11 |
| 4,160,422 | 7/1979 | Barber et al. .................. | 112/121.11 |
| 4,359,953 | 11/1982 | Martell et al. .................. | 112/121.11 |

FOREIGN PATENT DOCUMENTS

| | | |
|---|---|---|
| 0068713 | 1/1983 | European Pat. Off. . |
| 2208409 | 6/1974 | France . |
| 2231048 | 12/1974 | France . |
| 2475588 | 8/1981 | France . |

*Primary Examiner*—Peter Nerbun
*Attorney, Agent, or Firm*—Christel, Bean & Linihan

[57] ABSTRACT

Sewing operations are automated, at least partially, using a controllable sewing machine. In an intial recording phase for the sewing operation to be effected, there are put into memory the instantaneous values of three sensed parameters, i.e. the elapsed time of sewing, the position of a sewing speed control element and the length of the sewing, at each time the position of the speed control element changes under the action of the operator. Then, in a reproduction phase, the time is detected in continuous fashion, as is the distance sewn, and the position of the speed control element is changed at each moment for which the time detected is equal to a time recorded, or for which the length sewn is equal to the length recorded.

10 Claims, 1 Drawing Figure

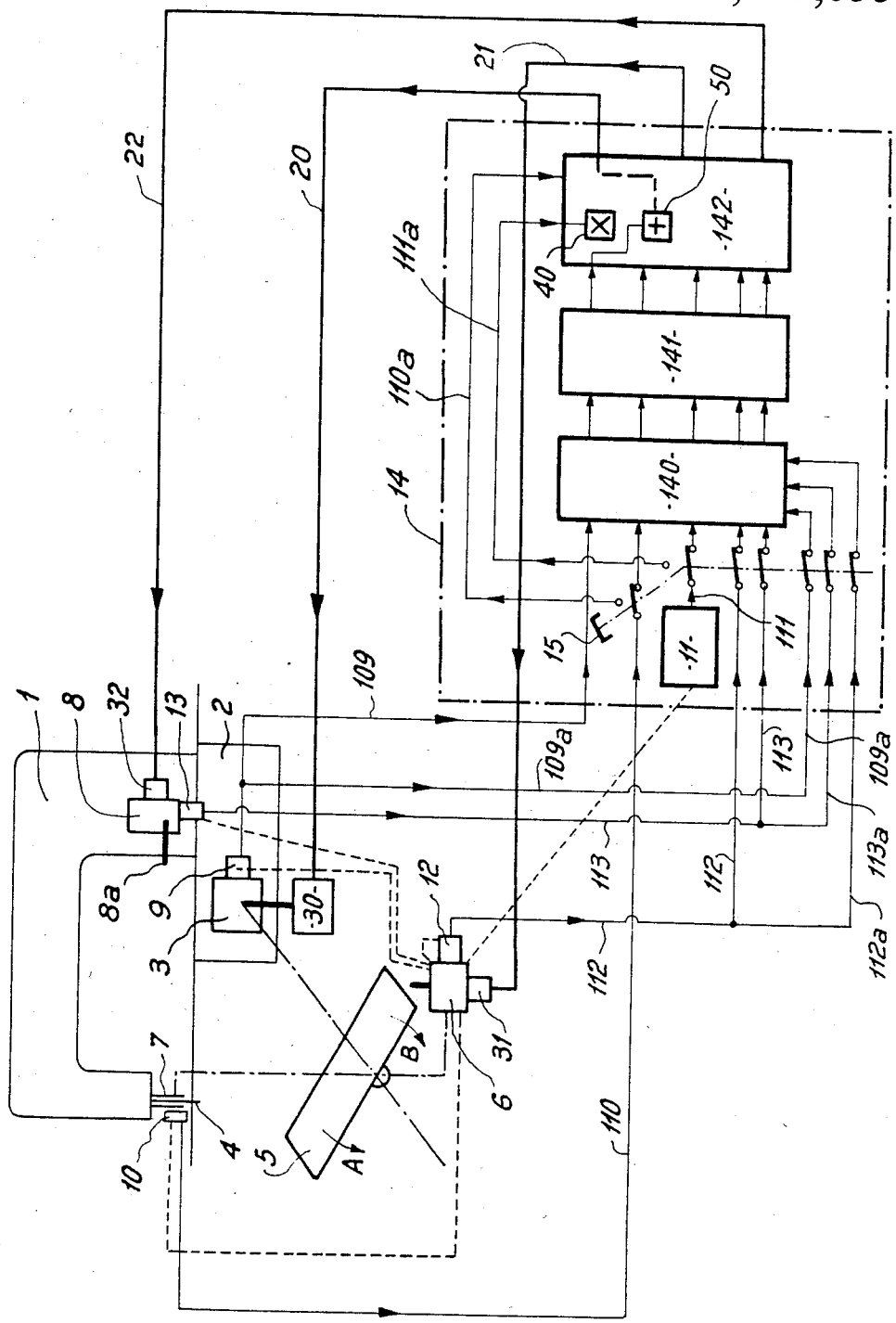

PROCESS FOR AT LEAST PARTLY AUTOMATING SEWING OPERATIONS AND SEWING MACHINE THEREFOR

The present invention relates to a process for at least partially rendering a sewing operation automatic in order to facilitate its repeated execution, and to a sewing machine adapted to put it into practice.

In the garment and hosiery industries, as well as in the manufacture of shoes, leather goods, saddlery and in the area of child care articles and even in furnishing and decoration, operatives reproduce in large numbers rigorously identical operations using sewing or stitching machines. This is particularly the case in manufacturing garments where the tasks are split up across a plurality of work stations at each of which an operative carries out the same operation (skirt hemming, oversewing, assembly, mounting of a collar or cuffs . . . ). In each of these operations there occurs some part which necessitates particular attention on the part of the operator such as the end of sewing, a change of direction, the formation of a collar point . . . and accordinly a more substantial strain on the nerves.

Research to alleviate this fatigue has led to the automation of repetitive operations. There are several known processes, more or less sophisticated, for providing such automation which consist essentially in starting with an initial registering for the sewing operation and then putting into effect the given values into a robot execution machine. In the majority of the cases, the known methods put to use counting the number of stitches in the sewing which gives rise to substantial difficulty when the material worked on is extensible. Since all materials have a certain extensibility (save for certain extremely rigid cloths) which introduce variations in behaviour which are not capable of being controlled in simple fashion, where it is subjected, by the feed apparatus of the machine and because of the fact of the guiding of the sewing by the operative, to mechanical stresses. Thus counting the stitches does not allow the regularity of a length of sewing to be ensured in certain fashion. For certain materials, one can in addition observe the formation of folds which render the finished piece unacceptable.

In order to try and remedy these disadvantages, attempts have been made to eliminate mechanical causes of fabric distortion, proceeding on the one hand to long and minutely detailed control of the feed devices which, as a result of their mechanical nature, have characteristics which vary over time, and by diminishing on the other hand the influence of the operator. These attempts have led to the idea of very specialized machines the extremely narrow of use of which is only appropriate to uniform manufacture of very large numbers of items. The inflexibility of such automation is not at all adapted to the majority of dressmaking houses. In addition the operation of these machines is effected by the operatives either by press buttons or done in contrast by information technology techniques developed to enable "dialogue" with the robot machine. The result of this is a disqualification of the operative or the necessity of making him undergo retraining which in all cases of interest only coincides rarely with his desires and particularly to an optimal utilization of his qualifications.

Taking these considerations into account, the applicant has sought a much more flexible automation for a sewing machine which would permit its use in numerous different cases and taking into account various materials without the necessity of putting into practice long and expensive control systems. The applicant has likewise sought to preserve to the operator the power of exercizing the essentials of his or her professional qualification, particularly his manual dexterity, all the while alleviating the majority of the more tedious tasks which generate nervous tension.

Thus to this end the invention has as its principal object a process for at least partially automating a sewing operation carried out with the aid of a sewing machine comprising a speed control by means of an element working in steps or stages according to which one starts first with a phase of recording the sewing operation to be effected in automatic fashion in order then to be able to reproduce the said sewing in a repetitive manner.

According to one of the principal characteristics of the invention, the recording phase comprises, after general activation of a time sensor, a sensor for the position of the sewing speed control element and a sensor for the length of the sewing, putting into storage the instantaneous values of each of these three parameters at each stage change, effected by the operative, of position of the abovementioned speed control element while the reproduction phase consists in detecting in continuous fashion the time and the distance of sewing starting from a general activation of the abovementioned stored value and in controlling the position of the speed control element at each time at which the detected time is equal to one of the values of time recorded in the case where the last recorded position of the speed control element corresponds to a zero speed and at each moment for which the distance detected is equal to one of the values of distance stored, in the case where the last position stored of the speed control element corresponds to a non-zero speed.

It is possible in unrestricted fashion to control the activation of the three abovementioned sensors at the same time as the lowering of the sewing foot of the machine.

In addition, in the recording phase, one proceeds to detect and memorize the putting into action of auxiliary elements of the machine effected by the operator by means of sensors and putting into memory at least the value of the time at the moment of this detection while in the reproduction phase, these auxiliary elements are controlled to come into operation using continuously a comparison of the detected time with the value memorized noted above.

Finally, in advantageous fashion the speed of carrying out of the reproduction phase can be controlled by modification of the values memorized of the speed changes and/or by modification of the detection of the time during reproduction.

Likewise the invention has as its second object a sewing machine which is partially automatic and which in particular comprises a motor drive mechanism in given relationship to the needle and the feed mechanism, a stepwise control device for the operating speed of the said mechanism, and a sewing foot and its control element in order to put into practice the abovementioned process, characterized in that it comprises:

a sensor for the length of material passing under the needle and located adjacent the latter, a sensor for the position of the speed control element mentioned above, a clock, an automatic actuation element for the speed control element mentioned above, an automatic actuation element for the control element for the sewing foot, a signal treating apparatus for treating the signals emitted by each of the sensors and the clock mentioned above in order to record their instantaneous value at each change in position of the speed control element during the recording phase, in order to establish comparison between these store signals and the signals emitted during the reproduction phase and for controlling, as a function of the results of the comparison, the abovementioned automatic actuation means for the speed control device.

In addition the abovementioned treatment apparatus comprises an input for the signal from a sensor of the change of state of at least one auxiliary element in order to record it at least together with the time and a control output for an automatic actuator element for the said auxiliary element during the reproduction phase at the moment when the time read is equal to the time recorded.

In addition and advantageously the treatment apparatus comprises means for controlling the speed of reproduction acting on the value of at least certain of the levels of the speed control stages recorded and on the reading of the time measured during the course of reproduction.

Finally, one will note the presence of a manual switch to pass from the recording phase to the reproduction phase while the activation of the sensors can be associated with the control for the movement of the sewing foot.

The invention will be better understood in the course of the description given hereafter, purely by way of an indicative example, which will permit the advantages and secondary characteristics to be brought out.

Reference should be made to the accompanying drawing which is a simplified schematic clarifying the various phases of the process according to the invention and the general means which permit it to be put into effect.

Referring to this drawing, one sees a sewing machine 1 comprising a drive motor mechanism 2 provided with a stepwise speed controller 3. The control of the movement of the needle 4 and the entrainment grippers for the material (not shown) is effected by the operative by means of a pedal 5 which acts on the speed controller 3. Generally this controller comprises eight speed steps, the first corresponding to a zero speed when the pedal is in its rest position. Increase in speed is obtained by moving pedal 5 in accordance with arrow A. By rocking back the pedal with one's heel (in accordance with arrow B) a device 6 for control of the movements of the sewing foot 7 is actuated in known fashion. There has been shown at 8 a member for reversing the running direction of the machine with, at 8a its manual control.

A first sensor 9 is associated with the speed controller 3 and emits at an output a signal representative of the position of the controller that is to say of each of the speed levels at which the machine can be operated. A second sensor 10 located in the immediate neighbourhood of the needle 4 emits an output signal representative of the length of material passing under the needle. This sensor can be constituted by means of a wheel rolling without sliding on the material or by any other suitable device. The third sensor 11 is in fact constituted by a clock which emits an output signal indicative of time and which constitutes the fundamental time for the apparatus.

In addition to these three principal sensors, there is associated with the command element 6 for the sewing foot 7 a sensor 12 emitting a signal representative of the raised or lowered state of this sewing foot. Likewise one should note the presence of a sensor 13 associated with the control 8 for reversing the movement of the machine. These last two sensors will be called sensors for auxiliary functions of the machine and illustrate in non-limitative fashion other sensors associated with other apparatus situated in the neighbourhood of the machine and capable of carrying out steps extrinsic to the sewing as such, such as the removal of the finished piece or folding it or transferring it elsewhere.

Each of these principal or auxiliary sensors are connected to the input of a treatment device 14 for the signals which they emit. It should be noted that their general activation can be ensured by a stop/go switch on the device or even by the rocking back of the pedal 5 and actuation of the device 6 (the dashed lines on the drawing synbolise this activation).

The leads 109 to 113 represent the connection of the sensors 9 to 13 to the treatment device 14. This device comprises schematically a reading unit 140 for the sensor signals which come to it by the abovementioned leads, a memory 141 capable of storing given values of the abovementioned signals and a comparator 142 carrying out a comparison, described in more detail hereinafter, between the stored values and the entry signals coming from the said sensors or certain of them operating as watching devices during the reproduction phase, the said comparator 142 emitting at an output automatic command signals to control the elements of the machine such as the speed control 3 or the auxiliary apparatus.

The treatment device 14 finally comprises a selector 15 for putting it either in recording phase or in a reproduction phase.

The process according to the invention is carried out in two phases: a first recording phase and a second reproduction phase, this latter being able to be repeated at will.

In order to record a sewing operation which has to be repeated, the operator places the piece under the foot 7 of the machine while the foot is in its upper position. By means of the switch 15 the apparatus or treatment device 14 is put into the recording mode. This operation consists particularly in connecting the sensors 9 to 13 to the inputs of the reading device 140. The operator then controls, by heeling back on the pedal 5, the lowering of the sewing foot 7 at the same time as the actuation of sensors 9 to 13. At this moment the apparatus 140 reads the information coming from the sensors (zero speed position for the sensor 9, zero distance for the sensor 10, time count for the sensor 11 . . . ). Then the operator presses the pedal in the direction of arrow A which generates a change in the state of the speed controller. This change of state, intercepted by sensor 9, is read by the reader 140 and via the line 109a, branched from line 109, actuates the release of material from the reader 140 into the memory 141. At this instant therefore the memory 141 records the information coming from sensor 9 (first level of the controller) of the sensor 10 (distance sewn zero) and of the sensor 11 (time $T_1$). The same recordings are produced at each change of state of the controller either in the sense of increasing the speed or in the sense of diminishing this latter. One thus records a picture of the progress of sewing by simultaneous recording of three parameters: speed level, distance sewn and time elapsed, at each change of behaviour.

In a first way of operating, at the end of sewing, the operator heels back the pedal which generates the raising again of the sewing foot 7, without deactivating the sensors. This heeling back detected by the sensor 12 is on the one hand read by the device 40 and on the other hand, via the branched lead 112a, interpreted as a signal for releasing the memory of three factors, time, speed (equal to 0) and distance sewn (equal to the distance previously recorded when the controller passed through its zero speed level) and likewise to the change in position of the sewing foot read by line 112. The operator can then manipulate the piece e.g. to change the orientation of sewing. The restarting of the sewing operations then commences by the lowering of the sewing foot 7 which generates a new recording of the time, speed and distance parameters and the new change of state of the sewing foot (controlled by a new heeling back or any other device). The following operation is recorded as described previously.

In a second possibility, the operator actuates at the end of sewing a reversal device. The effect of this action is, on the treatment device 14, the same as that of a change in state of the sewing foot (release into memory of the time, distance, speed parameters and recording of the position of the reversal).

Once sewing is finished, the operator actions the raising of the sewing foot (with the subsequent memorization) and the thread cutter (not shown but having the same effects as the actioning of the sewing foot or of the reverser, that is to say all of the so-called auxiliary functions, on the device 14). The operator then operates the switch 15 to place the device 14 either in a neutral position or into a reproduction position. There occurs, for example by means of the action of the thread cutter, deactivation of sensors 9 to 13.

In a third possibility, at the end of the first sewing, the operator has to carry out a delicate operation such as for example oversewing the point of a shirt collar. Having raised the pedal 5, the operator actuates the switch 15 which places the device 14 into a neutral position, with memorization of a stop in recording. The sewing foot not having been raised, the operator continues sewing carrying out the delicate operation without this being recorded. Fresh action on the switch returns the device 14 into its recording mode for following the same operation which takes place as described previously.

One can incorporate during this first phase of the process according to the invention the registration of the three parameters mentioned above at the moment of each change in position of an auxiliary element with which a particular auxiliary sensor is associated.

In the reproduction phase, the operator places the switch 15 into the reproduction position which has in particular the effect of disconnecting sensors 9 to 13 from the input of the reader 140 and of connecting the sensor 10 via line 110a and the sensor 11 via a line 111a to the input of the comparator 142. Having then placed the piece to be sewn under the machine foot 7, the operator heels back on pedal 5 in order on the one hand to lower the sewing foot and on the other to actuate the sensors. The comparator 142 reads the variation of the parameters time and distance which it receives at its input. Initially only the time varies and the comparator, having noted that the speed level recorded is zero, carries out a comparison of this time with the value $T_1$ extracted from memory 141. At the moment of equality, the comparator reads the second value stored of the speed level and transmits this value via its output 20 to a device 30 for automatic control of the controller 3. The comparator 142 is then taken into account the fact that the speed of the machine is not zero and carries out the following comparison between the second value of distance memorized and the distance effectively read via the sensor 10 and which is transmitted to it via line 110a. At the moment of these two values being equal, the comparator 142 emits to the device 30 a signal corresponding to the third value of speed registered. The recorded operation is thus reproduced. At the time when the last value of speed emitted at the output of the comparator is zero, the comparator takes up again reading the time reecied from clock 10 and compares it to the subsequent memorized value. At this instsant it receives from the memory the value of the recorded control parameter in order to be able to know, in the first recording possibility, the raising of the sewing foot which it transmits via line 21 to the corresponding automatic actuator 31, in the second recording possibility the actuation of the reversing device which it transmits via the output line 22 to the corresponding automatic control device 32 and in the third possibility the cessation of reproduction with, if it is the case, automatic return of the switch 15 into the neutral position.

In the first and second recording possibilities, continuation of the reproduction takes place as previously described with comparison of the elapsed time with that memorised step by step if the position stated of the controller (by reading its stored value) is a zero speed position or comparison of the distance which the material has progressed if this value corresponds to a non-zero speed.

By the choice of one of the comparison parameters (time or distance) carried out during reproduction, the invention permits reproducibility of the sewing recorded with a very substantial precision while eliminating most of the mechanical human factors which bear on such reproducibility.

In the third recording possibility, the operator proceeds with the sewing of the delicate part of his work under manual command until this is finished, and then restores the switch 15 to its reproduction position and proceeds with automatic operation.

The invention in addition allows the overall speed of the reproduction operation to be varied by means of manually or pre-programmed controllable regulators. Thus at 40 there is schematically shown a time multiplier introduced into comparator 142. If in effect the time is read by counting pulses, by doubling in known fashion the number of pulses delivered to the input of comparator 142 by clock 11, one divides by two the time during which the number of pulses read amounts to those memorized.

In the same way at 50 there is schematically drawn a logic device which permits the value of the signal extracted from the memory 141 to be changed and directed towards the device 30 adding thereto one or two greater speed stages (or reducing thereby) relative to that effectively recorded (for non zero speed stages). Thus the speed of reproduction of the sewing can be increased (or one can diminish it) with reference to that effectively recorded.

It can be seen that process and the machine in accordance with the invention, as well as giving great precision which they allow to be obtained in terms of reproducibility of the sewing operation, provide a vary substantial flexibility of use and accordingly offer very expanded possibilities of use. In addition, because of its own conception, the invention permits numerous machines actually existing on the market to be automated. Finally it is an assembly which permits the subsequent addition of a very large number of auxiliary functions which exist around the operation of sewing.

The invention finds substantial application in the field of the clothing industry.

I claim:

1. In at least partially automatic sewing operation carried out with the aid of a sewing machine comprising a speed control involving an element operating in stages and equipped with a sensor for sensing the elapsed time of sewing, a sensor for sensing the position of the sewing speed control element and a sensor for sensing the length of sewing, the operation comprising a first recording phase for the sewing operation to be effected in automatic fashion without operator intervention and a subsequent reproduction phase in which said sewing is reproduced in repetitive fashion, the improvement wherein the recording phase comprises, after the general activation of the sensor for sensing the elapsed time of sewing, of the sensor for sensing the position of the sewing speed control element and of the sewing length sensor, the placing in memory of the instantaneous value of each of three parameters generated by the sensors at each change of the position of the machine speed control element controlled via the operator during conventional operation of the sewing machine and wherein the reproduction phase consists of detecting in continuous fashion the time and the sewing distance starting from a general activation of the abovementioned sensors and controlling the position of the speed control element at each moment for which the detected time is equal to one of the values of time recorded in the case where the last recorded position of the speed control element corresponds to a zero speed, and at each moment for which the detected distances equal one of the values of distance recorded in the case where the last position recorded of the speed control element corresponds to a non zero speed.

2. The at least partially automatic operation of claim 1 wherein the activation of the three above-mentioned sensors is controlled at the same time as the lowering of a sewing foot of the sewing machine.

3. The operation of claim 1 wherein in the recording phase the detection and memorization of the putting into action of auxiliary elements of the machine carried out by the operator are effected by means of sensors and at least the value of the time at the moment of this detection is put into memory while in the reproduction phase the actuation of these auxiliary elements is controlled by means of comparison of the time detected continuously with the abovementioned memorized value.

4. The operation of claim 1 wherein the beginning and end of each of the phases of recording and reproduction are manually controlled.

5. The operation of claim 1 wherein the overall speed of the reproduction phase can be controlled by modification of the stored values of the speed stages and/or by modification of the detection of the time during reproduction.

6. In a partially automatic sewing machine including:
a drive motor mechanism in fixed relationship to a needle and to a fabric feed system,
a stepwise speed control device for controlling the said mechanism,
a sewing foot and its control element,
a sensor for sensing the length of material passing under the needle,
and situated near the needle,
a sensor for sensing the position of the abovementioned speed control, and
a clock,
the improvement comprising means for enabling a recording phase for the sewing operation to be effected in automatic fashion without operator intervention and a subsequent reproduction phase to be effected in which said sewing is reproduced in repetitive fashion, said means including:
an automatic actuator element for the abovementioned speed control device,
an automatic actuation element for the sewing foot control, and
a treatment device for treating the signals emitted by each of the said sensors and the clock for
(a) recording their instantaneous value at each change in position of the speed control element during the recording phase,
(b) establishing a comparison between these recorded signals and the signals emitted during the reproduction phase, and
(c) controlling, as a function of the results of the comparison, the abovementioned automatic actuation element of the speed control device.

7. The sewing machine of claim 6 wherein the said treatment device comprises an input for the signal of a sensor of the change of state of at least one auxiliary element for recording it concomitantly with at least the time and a control output for an automatic actuator element of the said auxiliary element in the reproduction phase at the moment when the time read is equal to the time recorded.

8. The sewing machine of claim 6 wherein the treatment device comprises a control means for the speed of reproduction and acting on the value of at least certain of the levels of the speed steps recorded and on the reading of the time measured during reproduction.

9. The sewing machine of claim 6 wherein the treatment device comprises a manual selector adapted to select between the recording phase and the reproduction phase.

10. The sewing machine of claim 6 wherein the actuation of the said sensors is associated with the control for the movement of the sewing foot.

* * * * *